United States Patent
Kor (10) Patent No.: US 10,337,661 B2
(45) Date of Patent: Jul. 2, 2019

(54) THERMAL INSULATED ICE HOLE WRAP DEVICES AND METHODS

(71) Applicant: John Cryiel Kor, Mankato, MN (US)

(72) Inventor: John Cryiel Kor, Mankato, MN (US)

( * ) Notice: Subject to any disclaimer, the term of this patent is extended or adjusted under 35 U.S.C. 154(b) by 0 days.

(21) Appl. No.: 15/821,234

(22) Filed: Nov. 22, 2017

(65) Prior Publication Data

US 2018/0259114 A1 Sep. 13, 2018

Related U.S. Application Data

(60) Provisional application No. 62/468,085, filed on Mar. 7, 2017.

(51) Int. Cl.
| | |
|---|---|
| *F17C 1/12* | (2006.01) |
| *F25D 3/02* | (2006.01) |
| *A01K 97/01* | (2006.01) |
| *B65D 81/38* | (2006.01) |
| *F16L 59/02* | (2006.01) |
| *F16L 59/12* | (2006.01) |

(52) U.S. Cl.
CPC ............ *F16L 59/029* (2013.01); *A01K 97/01* (2013.01); *F16L 59/12* (2013.01); *F17C 1/12* (2013.01); *F25D 3/02* (2013.01); *B32B 2307/304* (2013.01); *B65D 81/38* (2013.01); *Y02A 40/968* (2018.01)

(58) Field of Classification Search
CPC ...... A01K 97/01; F25D 2331/801; F25D 3/02
See application file for complete search history.

(56) References Cited

U.S. PATENT DOCUMENTS

| | | | |
|---|---|---|---|
| 6,422,032 B1 * | 7/2002 | Greene | F25D 3/08 62/457.2 |
| 2001/0045047 A1 * | 11/2001 | Smolinski | A01K 97/01 43/5 |
| 2010/0270317 A1 * | 10/2010 | Kieling | A45C 3/001 220/592.25 |

OTHER PUBLICATIONS

"Catch Covers keep snow, dirt and road salt out of your fish house!", as advertised by The Original Catchcover Hard-Nosed Fish House Products (catchcover.com), in OutdoorsWeekly.com Monthly Sportsmen's Magazine, p. 8, Dec. 2013, 33 total pages.
'GoIceFish.com' [online]. "GoIceFish.com Hole Sleeves," Available on or before Apr. 5, 2016 (available via WayBack Machine <https://web.archive.org/web/20160405021752/http://goicefishing.com/accessories/hole-sleeves/>), [retrieved on Mar. 29, 2018], Retrieved from the Internet: >http://goicefish.com/accessories/hole-sleeves/>, 2 pages including.

* cited by examiner

*Primary Examiner* — Elizabeth J Martin
(74) *Attorney, Agent, or Firm* — Fish & Richardson P.C.

(57) ABSTRACT

Ice hole wraps configured to be positioned in a floor of an ice shelter are provided, such as an ice hole wrap that includes a first circular end, a second circular end, a cylindrical wall extending between the first and second ends, and a height extending between the first and second circular ends. The wall is foldable between a first configuration in which the cylinder has a first height between the first and second circular ends, and a second configuration in which the cylinder has a second height between the first and second circular ends.

20 Claims, 8 Drawing Sheets

THERMAL INSULATED ICE HOLE WRAP DEVICES AND METHODS

CROSS-REFERENCE TO RELATED APPLICATIONS

This application claims the benefit of U.S. Provisional Application Ser. No. 62/468,085, filed Mar. 7, 2017. The disclosure of the prior application is considered part of (and is incorporated by reference in) the disclosure of this application.

TECHNICAL FIELD

This document describes ice hole wraps, such as insulated ice hole wraps for ice fishing structures, and processes for manufacturing ice hole wraps.

BACKGROUND

Structures supported on ice, such as ice fishing shelters supported on a frozen body of water, commonly include a heated shelter having a floor above the ice, and openings through the floor to access the ice and body of water below. Typically, holes are cut through the ice using a circular auger having a predetermined diameter, and the openings through the floor may be of slightly larger size to access the hole. Covers are often placed over the openings through the floor when not in use, and in some cases, the openings may have a perimeter fitted with a frame, such as a circular-shaped flange, engageable with the cover. Various structures have been used between the floor and ice surface, such as rigid tubes made of polyvinylchloride (PVC).

SUMMARY

Some embodiments described herein include devices, systems, and methods configured to provide closure, insulation, and/or protection between a floor of a shelter, such as an ice fishing shelter, and a layer of ice that supports the ice fishing shelter. In some embodiments, an ice hole wrap is provided that includes one or more layers of foldable material that may extend between a floor of the shelter and the surface of the ice (or water above the ice) to reduce airflow between the interior and exterior of the shelter.

Ice shelters, such as ice fishing shelters, are often positioned such that a gap is present between the floor of the shelter and the surface of the ice (e.g. the floor is raised out of direct contact with the ice by wheels, runners, blocks, etc.). The height of the gap may vary depending on ice conditions, shelter construction and configuration, placement, etc. Separation may result in air leaks that affect the thermal characteristics of the ice shelter, including ingress of cold air and egress of warm air that may affects the comfort within the ice shelter, the energy efficiency of the ice shelter, and reduce control of the thermal characteristics of the ice shelter. In some exemplary embodiments described herein, an ice hole wrap is provided that is foldable such that a height of the ice hole wrap is adjustable to accommodate a particular height between the floor of an ice shelter and a surface of the ice.

Particular embodiments described herein include an ice hole wrap configured to extend at least partially between a floor of an ice shelter and a surface of ice that supports the ice shelter, comprising a cylindrical wall having a first circular end, and a second circular end, the cylindrical wall defining a circular opening and having a height between the first and second circular ends. The wall is foldable between a first configuration in which the cylinder has a first height between the first and second circular ends, and a second configuration in which the cylinder has a second height between the first and second circular ends, the first height different than the second height. In the first configuration the first circular end is defined by a folded region of the first foldable material.

In some implementations, the system may optionally include one or more of the following features. The wall may include a first foldable material and a second foldable material, and the second foldable material may be covered by the first foldable material. The first material may include a waterproof canvas. The first material may include canvas and a polymer coating. The second material may include a non-fabric insulation. The second material may include a waterproof reflective insulation. The ice hole wrap may not include material layers in addition to the first and second materials. The second material may include a thermally-insulative material having an R-value that is greater than an R-value of the first material. The wall may include a first stitching line through the first material and the second material, the first stitching line oriented parallel to the first and second circular ends of the cylinder, the first stitching line positioned closer to the first circular end than the second circular end. The ice hole wrap may include two or more stitching lines oriented perpendicular to the first stitching line. The two or more stitching lines may include three stitching lines positioned equidistance from one another. At least one of the stitching lines may be a closure seam that secures the second material between first and second layers of the first material. The first layer of the first material may be an outer-most layer that defines an outer surface of the cylindrical wall, and the second layer may be an inner-most layer that defines an inner surface of the cylindrical wall. The first and second layers may be defined by a single, unitary fabric piece. The first layer may be defined by a first piece of the first foldable fabric material, and the second layer may be defined by a second piece of the first foldable fabric material, and the first and second pieces are secured together by stitching.

Particular embodiments described herein include a method of forming an insulated ice hole wrap, comprising: positioning a rectangular sheet of a first material around a first portion of a second material; securing the first material to the second material with a first seam oriented parallel to a widthwise edge of the first material and a widthwise edge of the second material; and securing a first lengthwise edge of the first material to a second and opposite lengthwise edge of the first material to form a cylindrical wall having a first end, a second end, an inner surface, and an outer surface; wherein the second material is completely encased within the first material.

In some implementations, the system may optionally include one or more of the following features. The method may further include sewing one or more structural seams along the cylindrical wall of the cylinder, the structural seams extending from the first end to the second end. Sewing one or more structural seams may be conducted prior to securing the first lengthwise edge of the first material to a second and opposite lengthwise edge of the first material. The method may further include folding the cylinder outwardly such that a first portion of the inner surface of the cylinder is inverted outwardly from the center of the cylinder and over the outer surface of the cylinder. A first portion of the outer surface of the cylindrical wall may extend over a second portion of the outer surface of the cylindrical wall such that the first portion of the outer surface is disposed between the first portion of the inner surface and the second portion of the outer surface.

The thermal insulated ice hole wraps and methods described herein may provide several advantages. First, ice hole wraps having an adjustable height may facilitate compatibility with a variety of ice structures and a variety of floor opening shapes and sizes. For example, the height of some ice hole wraps described herein may be adjusted by folding a lip or perimeter of the ice hole wrap. The ice hole wrap may thus provide closure, insulation, and/or protection, etc., to accommodate different ice shelter constructions and/or varying distances between an ice fishing house floor and the ice supporting the ice fishing house (e.g. such as when the ice shelter is supported above the ice on blocks or other supports to prevent freeze-in). An adjustable height also allows the ice hole wraps to be placed in a floor hole in a manner such that the ice hole wrap does not extend vertically above the floor. Accordingly, an adjustable ice hole wrap may reduce the height that the ice hole wrap extends above the surface of the floor, and may facilitate positioning a top edge of the ice hole wrap flush with the floor.

Second, some exemplary ice hole wraps described herein may be constructed of foldable, flexible materials. For example, ice hole wraps made from such materials may be collapsed or folded for storage and transport when not in use. Alternatively or additionally, the ice hole wraps may be adjusted to provide a pressure-fit within the openings. Such a construction may facilitate retention of the ice hole wrap, and reduce the presence of gaps between the ice hole wrap and the floor.

Third, some exemplary ice hole wraps described herein may be constructed of thermally-insulative materials, thus reducing heat transfer between the interior and exterior of the ice hole. Alternatively or additionally, some exemplary ice hole wraps described herein may be waterproof, thus reducing absorption of water during use. Various ice hole wraps thus provide a durable construction that may be reused over an extend period of time, such as several ice fishing seasons.

The details of one or more implementations are set forth in the accompanying drawings and the description below. Other features and advantages will be apparent from the description and drawings, and from the claims.

DETAILED DESCRIPTION

Figure 1:
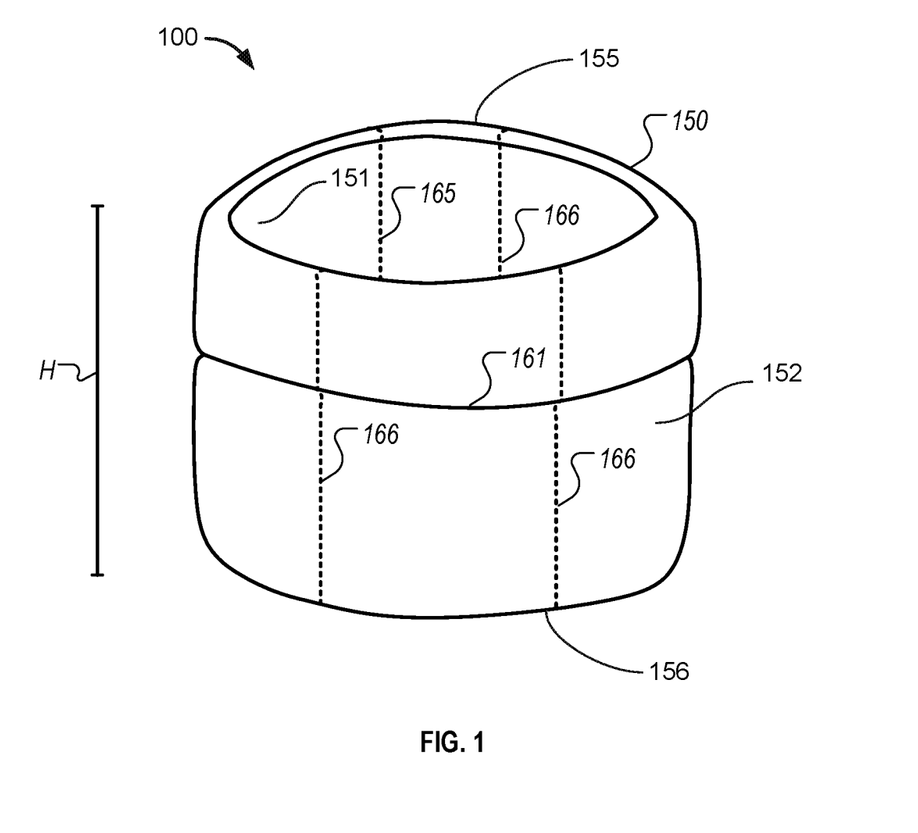
FIG. 1 is a perspective view of an exemplary ice hole wrap.

Referring now to FIG. 1, an exemplary ice hole wrap 100 is shown. The ice hole wrap comprises a cylindrical wall 150 having an inner surface 151 and an outer surface 152. The cylindrical wall 150 that defines an opening (e.g. a circular opening) that extends between a first end 155 and second end 156 of ice hole wrap 100. The ice hole wrap 100 provides a cylindrical wall 150 that may be positioned to extend between a surface of ice and a floor of an ice shelter supported on the ice. Ice hole wrap 100 may provide closure, insulation, and/or protection for the ice shelter from the exterior environment, while the opening through the cylindrical wall 150 allows access for a fishing line to pass through an opening in the floor (e.g. proximate first end 155), an opening in the ice (e.g. proximate second end 156), and into the lake or body of water below the layer of ice. The ice hole wrap 100 may be positionable in close contact with the floor or other structure of an ice shelter to prevent air drafts or otherwise reduce ingress of cold air or egress of warm air between the ice shelter and the exterior environment.

In an exemplary embodiment, ice hole wrap 100 may be constructed of one or more materials that provide structural and thermal characteristics. For example, ice hole wrap 100 may be constructed of first and second materials having different characteristics. In an exemplary embodiment, inner surface 151 and outer surface 152 are defined by a first material (e.g. the inner-most surface and the outer-most surface are defined by the same type of material). In some optional embodiments, a second material is enclosed or encapsulated within the first material, and is not visible during use of ice hole wrap 100.

Ice hole wrap 100 includes one or more stitching lines or seams that impart additional structural rigidity to ice hole wrap 100 and/or secure one or more components of ice hole wrap 100 to one or more other components of ice hole wrap 100. In an exemplary embodiment, a first seam 161 is oriented about circumference of the cylinder (e.g. parallel to a perimeter of the first and second ends 155, 156). First seam 161 may include stitching that passes through one or more layers of ice hole wrap 100. In an exemplary embodiment, first stitching line 161 passes through inner surface 151, outer surface 152, and one or more layers of material positioned between the inner and outer surfaces 151, 152. Alternatively or additionally, first seam 161 may be provided by taping, welding gluing, sewing, stapling, pinning, etc. In some embodiments, first seam 161 may be a closure seam at which one or more edges of one or more materials of ice hole wrap 100 are joined and/or closed. In other exemplary embodiments, first seam 161 may be a structural seam 161 that is not positioned at an edge of one or more materials and simply secures one or more layers of material to one or more other layers of material.

Alternatively or additionally, a seam 165 runs along an entire height (H) of the cylinder (e.g. perpendicular to the first seam 161). In some embodiments, seam 265 is a closure seam by which ends of a first material are secured to one another and/or a second material is enclosed within the first material. In some embodiments, one or more additional stitching lines 166 are present that impart structure to ice hole wrap 100 and secure one or more layers that make up ice hole wrap 100 to one another.

Ice hole wrap 100 has an overall height H between first and second ends 155, 156. The height H of ice hole wrap 100 may be adjustable such as by folding first and/or second ends 155, 156. FIG. 1 shows ice hole wrap 100 in an unfolded configuration. In various exemplary embodiments, ice hole wrap 100 has an overall height H in the unfolded configuration ranging from about 9 inches to about 36 inches, about 10 inches to about 24 inches, or about 16 inches. In various exemplary embodiments, ice hole wrap 100 includes one or more foldable, flexible materials, such that ice hole wrap 100 may be folded to adjust height H between first and second ends 155, 156.

In some optional embodiments, the ice hole wrap 100 is positionable in the external environment (e.g. external to an ice shelter), such as supported on the ice above an ice fishing hole external to an ice shelter. The ice hole wrap 100 may include one or more structural reinforcements that facilitate sufficient rigidity such that the ice hole wrap 100 may stand on the ice. Alternatively or additionally, the ice hole wrap 100 may be configured with a cover portion that covers first end 155. Ice hole wrap 100 may thus provide protection to an ice hole that prevents the ice hole from freezing, or reduces the rate at which ice forms on the ice hole.

In some optional embodiments, the ice hole wrap 100 may include one or more fishing components, such as a reel and a flag configured to be movable to a raised position upon rotation of the reel. In this way, the ice hole wrap 100 may be configured as a tip-up fishing device that provides protection for an ice hole, reel, and or other components within the ice hole wrap 100 when in use, while being collapsible and flexible for storage and transportation between periods of use.

Figure 2:
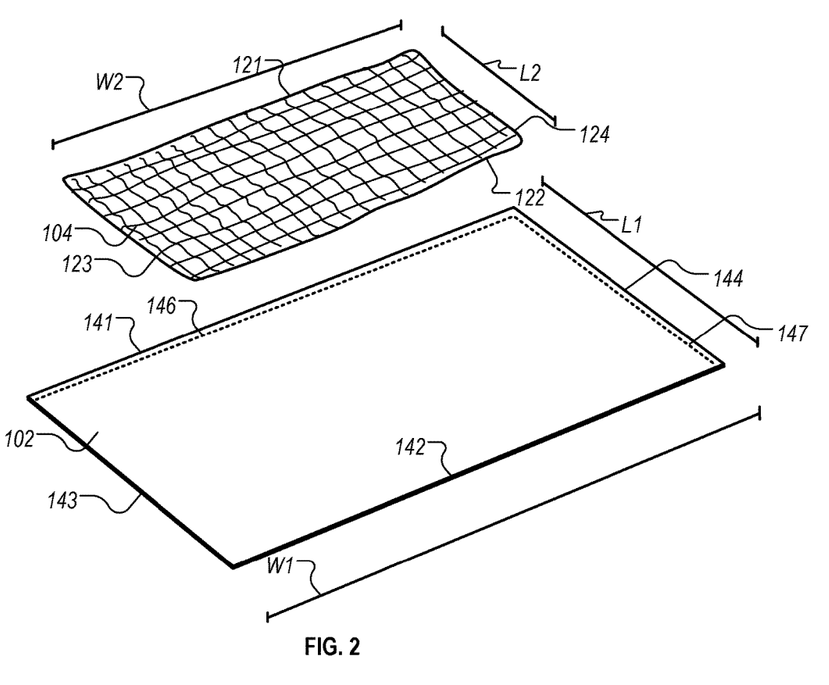
FIG. 2 is a perspective view of exemplary materials used in creating thermal insulated ice hole wraps.

Referring now to FIG. 2, an exploded view of exemplary materials of an unassembled ice hole wrap are shown. In some embodiments, the materials include a first material 102 and a second material 104. First and second materials 102, 104 may have generally rectangular shapes. In an exemplary embodiment, first material 102 is larger (e.g. has a larger surface area) than second material 104. First material 102 has edges 141, 142, that define a width dimension (W1) and edges 143, 144 that define a length dimension (L1).

Second material 104 has two edges 121, 122 that define a width dimension (W1), and two edges 123, 124 that define a length dimension (L1, L2). In an exemplary embodiment, first material 102 is sized to partially or completely envelop or surround second material 104 to from an assembled ice hole wrap, such as ice hole wrap 100 described with reference to FIG. 1.

In an exemplary embodiment, first material 102 is a flexible, foldable material, such as a flexible, foldable fabric material. For example, first material 102 may have characteristics suitable for stitching (e.g. to itself or with one or more other materials, such as second material 104) and manual manipulation during manufacturing and use. In an exemplary embodiment, first material 102 may include canvas (cotton or non-cotton), linen, denim, polyester, nylon, ballistic nylon, flexible PVC, combinations thereof, and/or blended materials.

First material 102 can, in some embodiments, be a laminated material, such as a laminated fabric. For example, first material 102 may be a waterproof polyester/polyurethane laminate such as a polyurethane laminate fabric (PUL). Alternatively or additionally, first material 102 may include a canvas such as a canvas having a 300 denier, 400 denier, 500 denier, 600 denier or up to 1000 denier or greater denier. The canvas may include a waterproof coating or layer, such as a waterproof PVC coating on one or both sides of the canvas.

In some embodiments, first material 102 may include a hem along at least one lengthwise edge (e.g. hem 147 along edge 144) and a hem along at least one widthwise edge (e.g. hem 146 along edge 141) in which the material has been turned over and attached to itself, such as by stitching, welding, gluing, taping, pinning, etc. The hems may have a width from about 0.1 inches to about 0.8 inches, 0.4 inches to 0.6 inches, 0.25 inches, or 0.5 inches. In some embodiments, first material 101 may have a width (e.g. prior to hemming) from about 16 inches to 128 inches, from about 36 to 48 inches, from about 44 to 46 inches, or about 45 inches. First material 102 may have a length of from about 6 to about 72 inches, from about 12 to about 28 inches, from about 24 to about 26 inches, or about 25 inches.

In various exemplary embodiments, the unassembled materials shown in FIG. 2 may include second material 104. Second material 104 may include a thermally-insulative material, such as a material having greater thermally-insulative properties than first material 102 (e.g. a greater R-value). For example, second material 104 may include a material having insulative properties, such as reflective film, flannel, wool, silk, insulative batting, etc. In an exemplary embodiment, second material 104 may include outer reflective layers (e.g., foil, metallized polyester, etc.) attached to an inner layer of gas-filled bubbles, such as polyethylene bubbles. In some embodiments, second material 104 may include parallel corrugations (e.g. oriented parallel to length (L1) and edges 123, 124). Corrugations may provide additional structure to an ice hole wrap assembled from second material 104, and/or promote flexibility in a direction parallel to the corrugations. In some embodiments, the corrugations are spaced equidistant from each other.

In some embodiments, second material 104 may be a non-fabric insulating material. For example, second material 104 may comprise a reflective foil, a polymeric material, foam, or other non-fabric insulating material. Some embodiments of second material may comprise foam, glass beads, or polymer bubbles disposed between two or more outer layers. In some embodiments, second material may comprise one or more heat reflective layers and one or more layers of air or gas bubbles encased within a polymeric material. Alternatively or additionally, second material 104 may include one more layers of polyester or other material. In various exemplary embodiments, second material may thus be single-layered or multi-layered, and/or may include woven and/or non-woven materials. In an exemplary embodiment, second material 104 may be a thermally-insulative material commercially available as REFLECTIX double reflective standard edge insulation.

In various exemplary embodiments, first and/or second materials 102, 104 may be waterproof (e.g. completely or partially waterproof such that absorption of water during use is limited). Waterproof materials may reduce absorption of water during use, and/or may promote consistent thermal characteristics that could otherwise be affected if the materials became waterlogged. Alternatively, or additionally, waterproof materials may reduce the need to dry the ice hole wrap after a period of use. In an exemplary embodiment, both first and second materials 102, 104 have waterproof characteristics. In other exemplary embodiments, first material 102 is sufficiently waterproof to protect second material 104 from substantial exposure to water during use.

In some embodiments, first material 102 and/or second material 104 have thicknesses and/or rigidity sufficient to allow an ice hole wrap to stand unsupported. For example, second material 104 may have a thickness ranging from about 0.2 inches to about 0.9 inches, from about 0.3 to about 0.5 inches, from about 0.3 to about 0.4 inches, or about 0.3125 inches. Second material 104 may have a width, prior to hemming, of from about 38 inches to 44 inches, from about 40 to 42 inches, from about 39 to 41 inches, from about 41 to 43 inches, about 40 inches, about 41 inches, or about 42 inches. In some embodiments, the width W1 of first material 102 is greater than the width W2 of second material 104. Second material 104 may have a length of from about 10 to about 12 inches, from about 10.5 to about 11.5 inches, or 11 inches. In some embodiments, the length L1 of first material 102 is greater than the length L2 of second material 104.

Figure 3A:
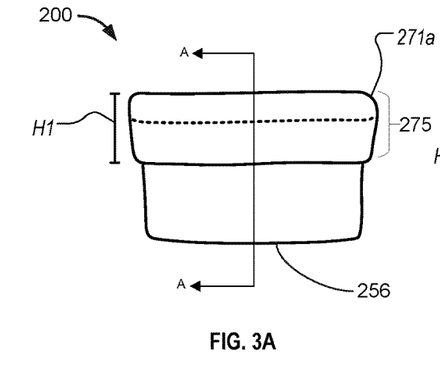
FIG. 3A is a perspective view of the exemplary ice hole wrap of FIG. 1 in a first folded configuration.
Figure 3B:
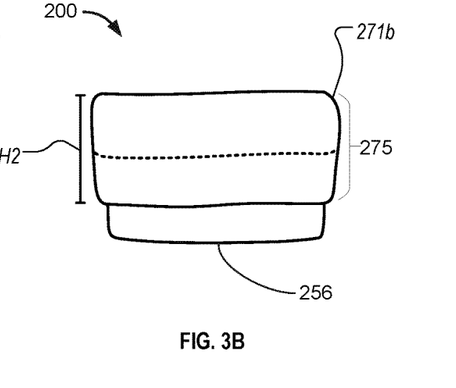
FIG. 3B is a perspective view of the exemplary ice hole wrap of FIG. 1 in a second folded configuration.
Figure 3C:
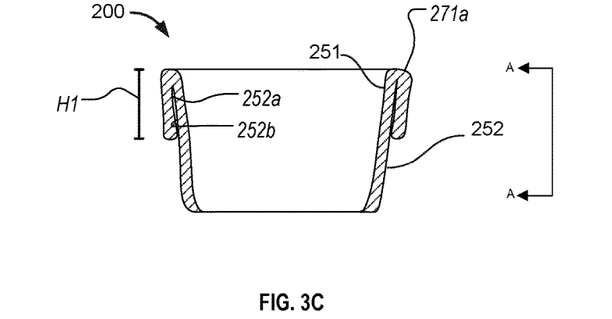
FIG. 3C is a cross-sectional view taken along line A-A of the first folded configuration of the exemplary ice hole wrap shown in FIG. 3A.

Referring now to FIGS. 3A-3C, an exemplary ice hole wrap 200 is shown in a first folded configuration (FIG. 3A) and a second folded configuration (FIG. 3B). FIG. 3C shows a cross-sectional view taken along line A-A of the exemplary ice hole wrap 200 in the first folded configuration of FIG. 3A. In various exemplary embodiments, ice hole wrap 200 may include various features and characteristics described above with reference to FIGS. 1 and 2.

In the embodiment shown in FIGS. 3A-3C, the ice hole wrap 200 includes a first fold 271a such that a first portion of the inner surface 251 of the cylinder is inverted or rolled outwardly from the center of the cylinder and over the outer surface 252 of the cylinder. For example, the first end 255 may be folded over like a cuff. The folded first end 255 allows adjustment of the overall height of the ice hole wrap 200. By varying the portion of ice hole wrap 200 that is folded over itself, the height of ice hole wrap 200 may be varied to suit a particular ice shelter or a particular height between a floor of the ice shelter and the ice that supports the ice shelter.

In the configuration shown in FIGS. 3A-3B, ice hole wrap 200 includes a doubled upper portion or lip 275 in which one or more layers that define the cylinder 250 are doubled over themselves. In some embodiments, the fold results in first and second portions 252a, 252b of the outer surface 252 in direct contact with one another, or facing one another.

The height or thickness of the upper lip 275 created by the fold, and the overall height H of the ice hole wrap, may be adjustable based on the location of the fold. For example, in FIGS. 3A and 3C, the ice hole wrap 200 in the first configuration has an upper lip 275 having a first height H1, and in FIG. 3B the ice hole wrap 200 in the second configuration has an upper lip 275 having a second height H2. The second fold 271b is located closer to the second end 256 such that the second height H2 of the upper lip 275 is greater than the height H1 of the upper lip 275 shown in FIG. 3A. The overall height H of the ice hole wrap is thus adjustable based on the fold and height of the upper lip 275.

In some embodiments, the upper lip 275 may facilitate pressure or interference with a floor or feature of an ice structure that ice hole wrap 200 interacts with during use. For example, upper lip 275 may be biased to return to a circular or open shape that exerts pressure on a surrounding structure. In some optional embodiments, the upper lip 275 may thus promote an interference fit between the ice hole wrap 200 and a perimeter of the opening in the floor, hole flange, etc., the outline of a floor hole, such as a floor hole frame or annular flange.

Figure 4:
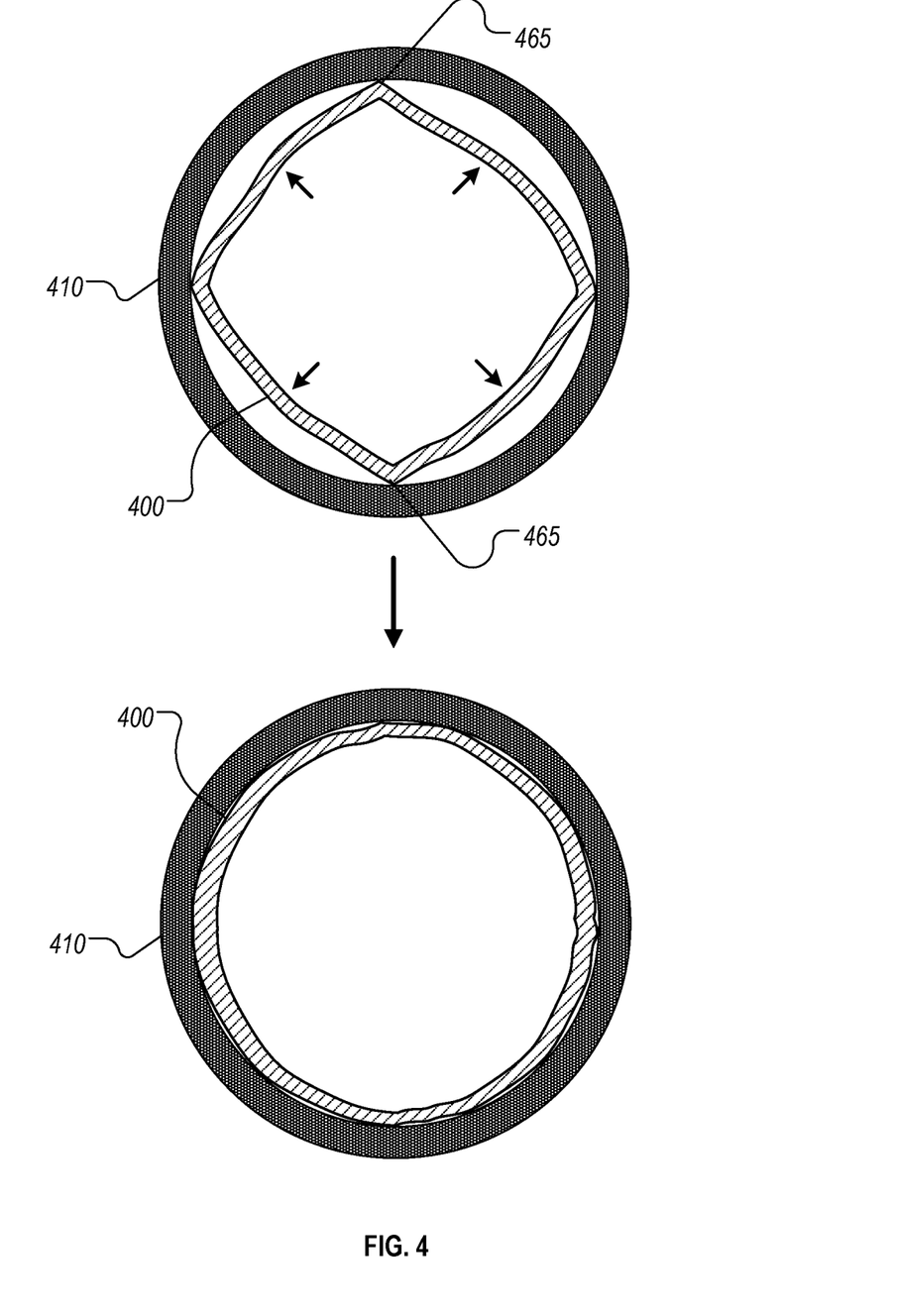
FIG. 4 is a top plan view of placement and adjustment of an exemplary ice hole wrap in a floor opening.

Referring now to FIG. 4, a top plan view is shown of an ice hole wrap in an intermediate position during placement and adjustment in a floor opening of an ice shelter, and when received in fitted engagement with the floor opening of the ice shelter. In some optional embodiments, the ice hole wrap 400 may be folded or compressed (e.g. manual folded or compressed) into an angular, e.g., approximately square, rectangular, or polyhedronal shape. As viewed from the top of ice hole wrap 400, one or more seams or stitching lines 465 may act as fold lines where the ice hole wrap 400 tends to fold. The manually compressed configuration, in some embodiments, results in a configuration in which the outer sides of the ice hole wrap 400 do not fully contact the perimeter 410 of the hole when initially positioned within the hole. After insertion, the ice hole wrap 400 may be allowed to expand to a cylindrical configuration, for example, in which outer surfaces of ice hole wrap 400 press outward radially from the center of the hole into close contact with perimeter 410 (e.g. such that a majority of the outer side of the wrap contact the interior of the perimeter 410 of the floor hole). In an exemplary embodiment, the ice hole wrap 400 is biased towards the cylindrical configuration and naturally returns to the cylindrical configuration. Perimeter 410 may, in some embodiments, be a perimeter of an opening in the floor (e.g. a perimeter defined by an opening cut through the floor material), a perimeter of a frame (e.g. attached to the floor), a flange, or other structure that defines the perimeter of the hole. In some embodiments, the ice hole wrap 400 is in the unfolded configuration (e.g. in which the top edge is not folded) during use, such that at least a portion of the cylinder is in contact with the interior of the perimeter of the floor hole, frame, flange, etc. In some embodiments, the ice hole wrap 400 may be used in a folded configuration (e.g. in which the top edge is folded over itself).

Figure 5A:
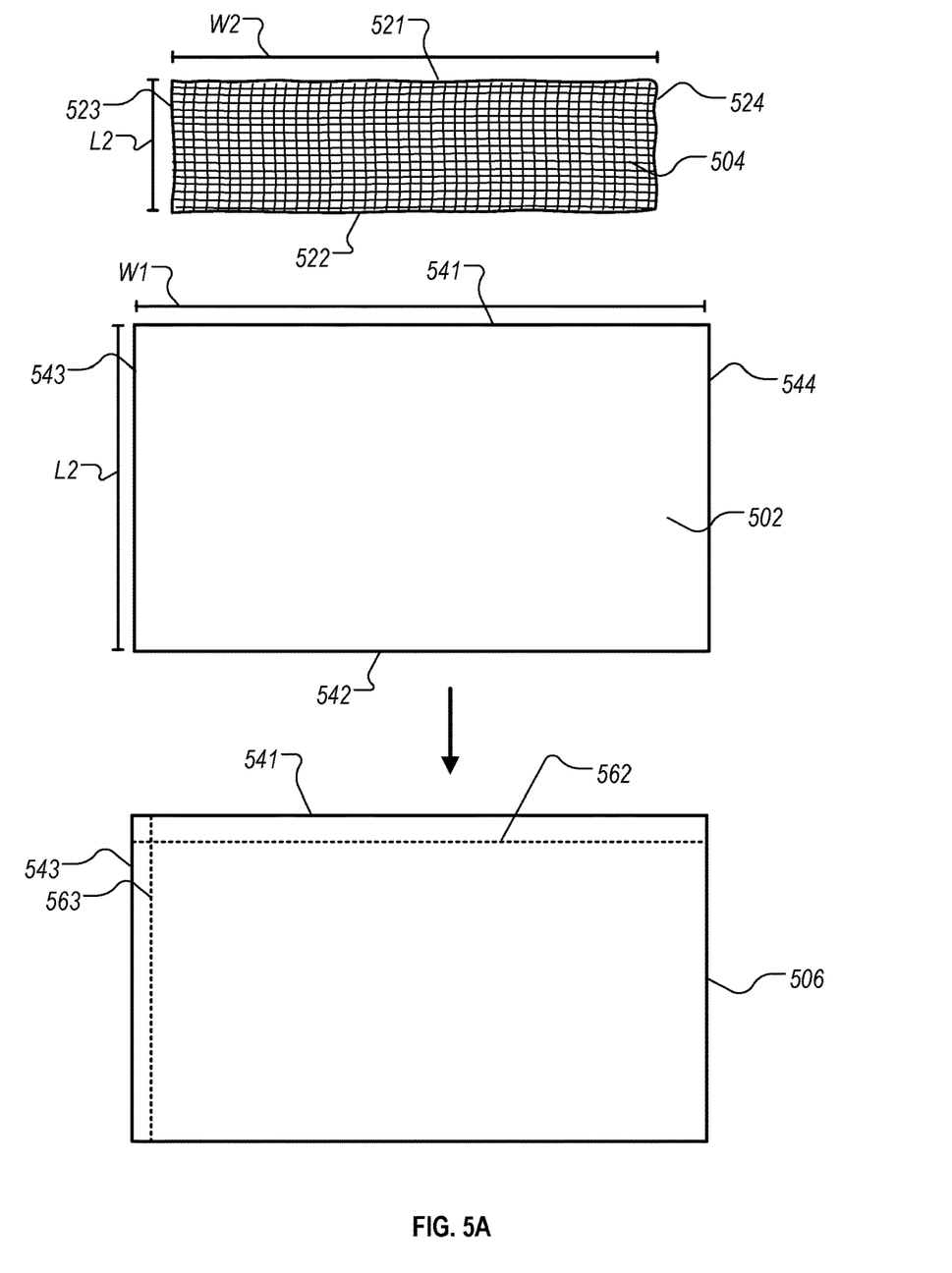
FIG. 5A shows a perspective view of an exemplary unassembled ice hole wrap.

Referring now to FIGS. 5A-5D, operations of an exemplary method of making an ice hole wrap are shown. A first material 502, and a second material 504 that may be used to form an ice hole wrap are shown in FIG. 5A. In various exemplary embodiments, first and second materials 502, 504 may have features and characteristics similar to first and second materials 102, 104 described herein.

First material 502 is generally rectangular and has two widthwise edges 541, 542 and two lengthwise edges 543, 544. Alternatively or additionally, second material 504 is generally rectangular and has two widthwise edges 521, 522, and two lengthwise edges 523, 524. In an exemplary embodiment, first material 502 has a width W1 and a length L1, and second material 504 has a width W2 and L2. Width W1 and/or length L1 of first material 502 may be greater than width W2 and/or L2.

Some exemplary methods may include forming one or more hems in first material 502, such as by folding a portion of first material 502 along one or more edges and joining to itself. For example, an exemplary embodiment may include one or more operations of forming a widthwise hem 562 along width W1 and a lengthwise hem 563 along length L1. Hems 562, 564, may be formed by sewing (e.g. stitching), welding, gluing, taping, pinning, etc. Hems 562, 563 may be formed along a first width edge 541 and a first length edge 543 of first material 502 to form a hemmed material 506. The hem may have a width between about 0.1 inches to about 0.8 inches, 0.4 inches to 0.6 inches, 0.25 inches, or 0.5 inches.

Figure 5B:
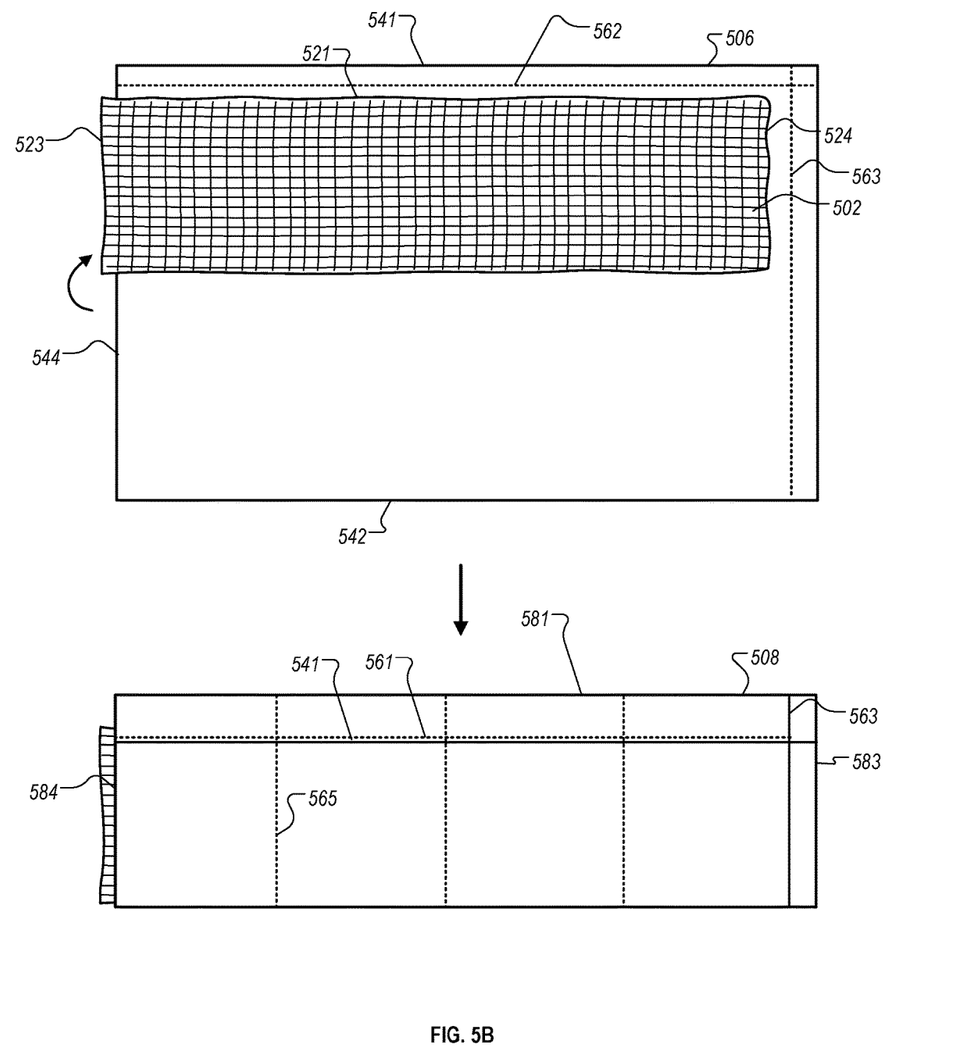
FIG. 5B shows an exemplary construction of an ice hole wrap.

Referring now to FIG. 5B, an exemplary method may include an operation of positioning second material 504 onto first material 502 (e.g. onto hemmed material 506) such that a majority of the surface area of second material 504 is positioned on hemmed first material 506. In some embodiments, second material 504 is positioned such that a portion of second material 504, including lengthwise edge 523 extends beyond an edge of hemmed material 506 (e.g. extends beyond an unhemmed lengthwise edge 544 of hemmed material 506). For example, the second material 504 may extend beyond an edge of hemmed material 506 about 0.2 to about 1.5 inches, about 0.5 to about 1.2 inches, or about 0.8 to about 1.1 inches.

In the intermediate configuration shown in FIG. 5B, a second lengthwise edge 524 of second material 504 opposite first lengthwise edge 523 is positioned parallel to a lengthwise hem 563 of hemmed material 506. A first widthwise edge 521 of second material 504 is positioned parallel and adjacent to the widthwise hem 562 of hemmed first material 506. In embodiments in which hemmed material 506 includes a laminated material or coating (e.g. PVC-laminated or polyurethane-laminated), second material 504 may be placed on the waterproof side (e.g. in direct contact with the waterproof material).

In an exemplary embodiment, a method of making an ice hole wrap may include folding hemmed material 506. The hemmed material 506 may be folded and/or wrapped around second material 504 (e.g. in the lengthwise direction). The hemmed lengthwise edge 541 of hemmed first material 506 may be placed over the unhemmed lengthwise edge 542 of hemmed first material 506.

An exemplary method may include forming one or more stitching lines or seams to impart structure, and/or to secure the hemmed first material 506 with the second material 504. A first seam 561 may be sewn through the multiple layers of hemmed first material 506 and second material 504 to secure hemmed first material 506 around second material 504. The result may be a panel 508 including hemmed first material 506 and second material 504 secured together by at least first seam 561 (e.g. formed by stitching, welding, gluing, taping, pinning, etc.).

In an exemplary embodiment, the first seam 561 may be positioned parallel to widthwise edge 581 of panel 508. For example, first seam 561 may be positioned between about 1 to about 3 inches from widthwise edge 581 of panel 508. Panel 508 may include two open (e.g. unfinished) lengthwise edges 583, 584 of hemmed first material 506, and in some embodiments, a portion of second material 504 may extend beyond second open lengthwise 584. In the configuration shown in FIG. 5B, a first open lengthwise edge 583 includes the lengthwise hem 563 of hemmed first material 506.

One or more structural seams 565 may be formed by stitching, welding, gluing, taping, pinning, etc. in a lengthwise direction (e.g. oriented parallel to the open lengthwise edges 583, 584). In some embodiments, the structural seams 565 may be positioned equidistant from one another. For example, one or more structural seams are positioned such that when a closure seam is sewn to form the ice hole wrap in a cylindrical configuration, the closure seam and structural seams 565 are together positioned equidistant from one another. In one embodiment, the structural seams 565 are positioned from about 9 to about 11 inches apart, from about 10 to 10.5 inches apart, or about 10.25 inches apart. Structural seams 565 may secure the first and second materials 502, 504 to one another. In some optional embodiments in which the structural seams 565 include stitching lines, the structural seams may include stitches that pass through second material 504 and first material 502 on both sides of second material 504. In various exemplary embodiments, the structural seams impart additional structural rigidity that resists folding or flexing in a widthwise direction (e.g. in a direction parallel to edge 541).

Figure 5C:
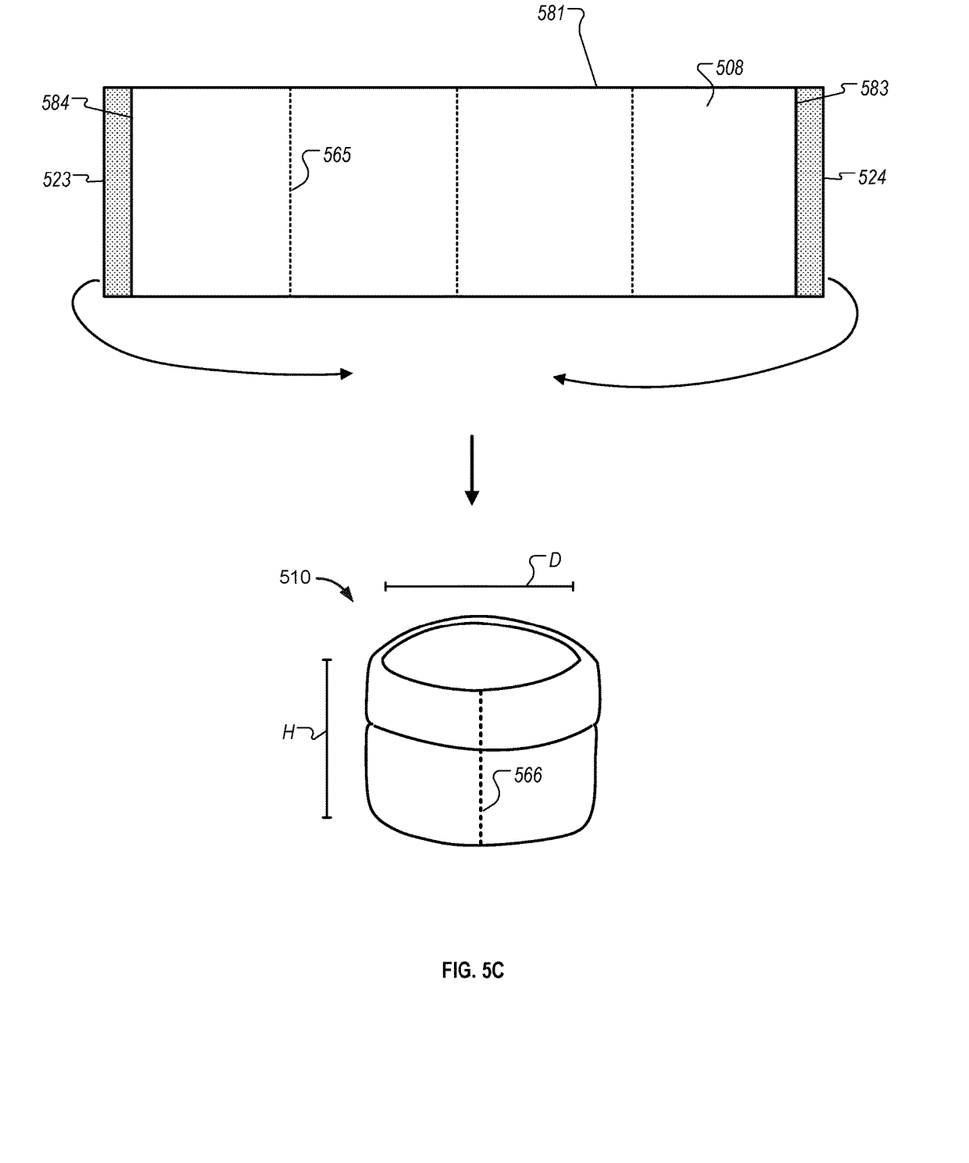
FIG. 5C shows an exemplary construction of an ice hole wrap into a cylindrical shape.

Referring now to FIG. 5C, an exemplary method may include securing opposite first and second lengthwise edges 523, 524 of second material 504 to one another and/or hemmed first material 508. For example, the hemmed first material 506 of the open lengthwise edge 583 having the lengthwise hem 563 of hemmed first material 508 may be pushed widthwise toward the center of panel 508 to expose the second lengthwise edge 524 of second material 504. The first and second lengthwise edges 523, 524 of second material 504 may thus be exposed on opposing lengthwise sides 583, 584 of panel 508. The first and second lengthwise edges 523, 524 of second material 504 may be brought together such that panel 508 is rolled inwardly widthwise to form a cylindrical shape (e.g. cylindrical cross-section). The first and second lengthwise edges 523, 524 of second material 504 may then be secured to maintain the cylindrical shape.

In some embodiments, the first and second lengthwise edges of second material 504 are secured together in the same plane such that only the edges are touching each other, while in other embodiments, the edges may overlap. The first and second lengthwise edges 523, 524 of second material 504 may be secured together by methods such as taping, welding gluing, sewing, stapling, pinning, etc. In an exemplary embodiment, the first and second lengthwise edges of second material 504 may be secured using adhesive tape. Exemplary types of adhesive tape that may be used include clear adhesive packaging tape, masking tape, foil tapes, and the like.

After securing the first and second lengthwise edges of second material 504 together, the portion of the hemmed first material 506 that was pushed widthwise along panel 508 to expose the second lengthwise edge of first material 502 may be manipulated to fully cover second material 504. The hemmed first material 508 may then be secured to second material 504 via a closure seam 566. The closure seam 566 may be oriented along the cylinder from top to secure the first and second materials 502, 504 and/or fully enclose the second material 504 within the first material 502.

In an exemplary embodiment, the final ice hole wrap 510 has a cylindrical shape having a diameter D, and height H. The diameter D may range from about 10 inches to about 20 inches, from about 12 inches to about 18 inches, or about 16 inches. In some embodiments, the ice hole wrap 510 may stand upright as a cylinder freely on its own. In some embodiments, the shape of ice hole wrap 510 approximates a cylinder, but may appear from a top view to have angles or an approximately square or rectangular shape (e.g. due to one or more structural seams).

Figure 5D:
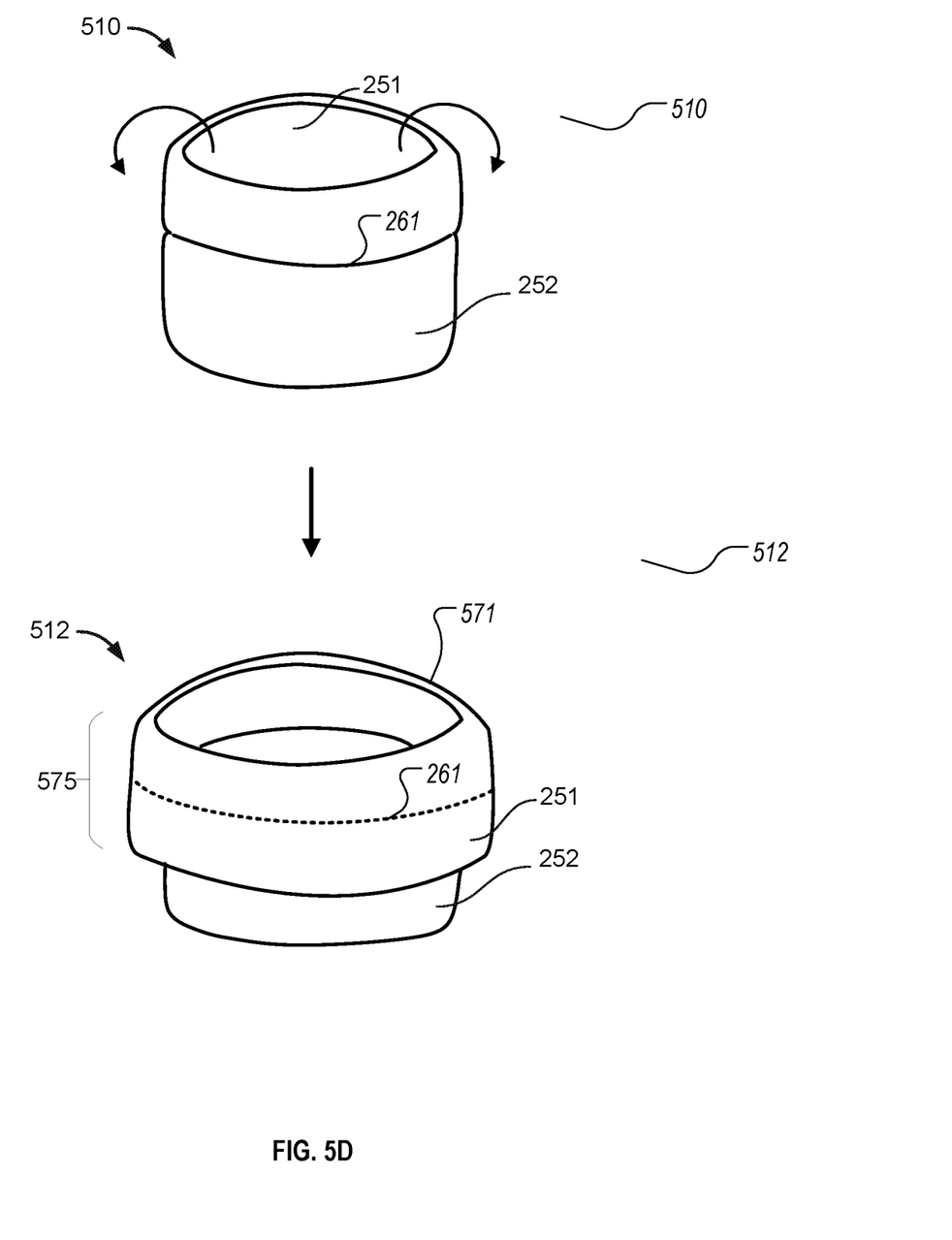
FIG. 5D shows an exemplary ice hole wrap in a first folded configuration and a second folded configuration.

Referring to FIG. 5D, cylindrical ice hole wrap 510 may be folded outwardly such that a first portion of the inner surface 251 of the cylinder is inverted or rolled outwardly from the center of the cylinder and over the outer surface 252 of the cylinder. Thus, upon folding, a first portion of the outer surface extends over a second portion of the outer surface such that the first portion of the outer surface is disposed between the first portion of the inner surface and the second portion of the outer surface. The resulting fold 571 creates a folded ice hole wrap 512 having a doubled upper portion, or upper lip 575. The ice hole wrap 510 may be refolded such that upper lip 575 has different heights, and therefore ice hole wrap 512 may be configured to have a selected overall height based on the height of upper lip 575. Accordingly, ice hole wrap 512 provides an adjustable ice hole wrap that may be selected to accommodate a distance between an ice shelter floor and an ice surface, and that may repeatedly be reconfigured over its useful life to adapt to changing conditions.

While this specification contains many specific implementation details, these should not be construed as limitations on the scope of any technology or of what may be claimed, but rather as descriptions of features that may be specific to particular embodiments. Certain features that are described in this specification in the context of separate embodiments may also be implemented in combination in a single embodiment in part or in whole. Conversely, various features that are described in the context of a single embodiment may also be implemented in multiple embodiments separately or in any subcombination. Moreover, although features may be described herein as acting in certain combinations and/or initially claimed as such, one or more features from a claimed combination may in some cases be excised separate from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Although a number of implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other aspects, advantages, modifications, and implementations are within the scope of the following claims.

What is claimed is:

1. An ice hole wrap configured to extend at least partially between a floor of an ice shelter and a surface of ice that supports the ice shelter, comprising:
   a cylindrical wall having a first circular end, and a second circular end, the cylindrical wall defining a circular opening and having a height between the first and second circular ends,
   wherein the cylindrical wall is foldable between a first configuration in which the cylindrical wall has a first height between the first and second circular ends, and a second configuration in which the cylindrical wall has a second height between the first and second circular ends, the first height different than the second height; and
   wherein in the first configuration the first circular end is defined by a folded region of a first foldable material.

2. The ice hole wrap of claim 1, wherein the cylindrical wall includes the first foldable material and a second foldable material, and the second foldable material is covered by the first foldable material.

3. The ice hole wrap of claim 2, wherein the first material comprises a waterproof canvas.

4. The ice hole wrap of claim 3, wherein the second material comprises a thermally-insulative material having an R-value that is greater than an R-value of the first material.

5. The ice hole wrap of claim 2, wherein the first material comprises canvas and a polymer coating.

6. The ice hole wrap of claim 5, wherein the second material comprises a waterproof reflective insulation.

7. The ice hole wrap of claim 6, wherein the ice hole wrap does not include material layers in addition to the first and second materials.

8. The ice hole wrap of claim 2, wherein the second material comprises a non-fabric insulation.

9. The ice hole wrap of claim 1, wherein the cylindrical wall includes a first stitching line through the first material and the second material, the first stitching line oriented parallel to the first and second circular ends of the cylinder, the first stitching line positioned closer to the first circular end than the second circular end.

10. The ice hole wrap of claim 9, further comprising two or more stitching lines oriented perpendicular to the first stitching line.

11. The ice hole wrap of claim 10, wherein the two or more stitching lines comprise three stitching lines positioned equidistance from one another.

12. The ice hole wrap of claim 11, wherein at least one of the stitching lines is a closure seam that secures the second material between first and second layers of the first material.

13. The ice hole wrap of claim 12, wherein the first layer of the first material is an outer-most layer that defines an outer surface of the cylindrical wall, and the second layer is an inner-most layer that defines an inner surface of the cylindrical wall.

14. The ice hole wrap of claim 13, wherein the first and second layers are defined by a single, unitary fabric piece.

15. The ice hole wrap of claim 13, wherein the first layer is defined by a first piece of the first foldable fabric material, and the second layer is defined by a second piece of the first foldable fabric material, and the first and second pieces are secured together by stitching.

16. A method of forming an insulated ice hole wrap, comprising:
   positioning a rectangular sheet of a first material around a first portion of a second material;
   securing the first material to the second material with a first seam oriented parallel to a widthwise edge of the first material and a widthwise edge of the second material; and
   securing a first lengthwise edge of the first material to a second and opposite lengthwise edge of the first material to form a foldable cylindrical wall having a first end, a second end, an inner surface, and an outer surface;
   wherein the second material is completely encased within the first material.

17. The method of claim 16, further comprising sewing one or more structural seams along the cylindrical wall of the cylinder, the structural seams extending from the first end to the second end.

18. The method of claim 17, wherein sewing one or more structural seams is conducted prior to securing the first lengthwise edge of the first material to a second and opposite lengthwise edge of the first material.

19. The method of claim 18, further comprising folding the cylinder outwardly such that a first portion of the inner surface of the cylinder is inverted outwardly from the center of the cylinder and over the outer surface of the cylinder.

20. The method of claim 19, wherein a first portion of the outer surface of the cylindrical wall extends over a second portion of the outer surface of the cylindrical wall such that the first portion of the outer surface is disposed between the first portion of the inner surface and the second portion of the outer surface.

* * * * *